United States Patent [19]

Reinauer

[11] 4,270,935

[45] Jun. 2, 1981

[54] FILTER ASSEMBLY FOR HIGH TEMPERATURE GLASS FIBER FILTER MEDIA

[75] Inventor: Thomas V. Reinauer, Summit, N.J.

[73] Assignee: United States Filter Corporation, New York, N.Y.

[21] Appl. No.: 38,789

[22] Filed: May 14, 1979

Related U.S. Application Data

[63] Continuation of Ser. No. 810,099, Jun. 27, 1977, abandoned.

[51] Int. Cl.$^3$ ............................................. B01D 46/02
[52] U.S. Cl. ....................................... 55/379; 55/302; 55/341 R; 55/528
[58] Field of Search ...................... 55/302, 341 R, 365, 55/379–382, 528; 210/486, 497 R

[56] References Cited

U.S. PATENT DOCUMENTS

| | | | |
|---|---|---|---|
| 1,847,368 | 3/1932 | Wendler | 55/379 X |
| 2,477,623 | 8/1949 | Kling | 55/341 R |
| 3,538,687 | 11/1970 | Pausch | 55/379 |
| 3,606,736 | 9/1971 | Leliaert et al. | 55/341 RX |
| 3,815,341 | 6/1974 | Hamano | 55/486 X |

*Primary Examiner*—Kathleen J. Prunner
*Attorney, Agent, or Firm*—Nims, Howes, Collison & Isner

[57] ABSTRACT

An improved filter assembly for high temperature dust collection operations including a rigid cylindrical open framework retainer member depending from an aperture in a tube sheet separating dirty and clean air plenums. Surrounding the open framework retainer is a flexible wire mesh sleeve for supporting an elongate tubular bag of permeable fabric filter material. A removably insertable rod member disposed between the flexible wire mesh sleeve and the open framework retainer effectively reduces the degree of play between the filter media supporting wire mesh sleeve and effectively increases the circumference of said sleeve to place the outer surface thereof into substantially continuous interfacial contact with the inner surface of said permeable fabric filter media disposed in surrounding relation therewith whereby the filter material is maintained in a substantially taut, smooth and unwrinkled condition during both normal filter flow and during cleaning operations.

10 Claims, 5 Drawing Figures

FILTER ASSEMBLY FOR HIGH TEMPERATURE GLASS FIBER FILTER MEDIA

This application is a continuation of co-pending prior application Ser. No. 810,099, now abandoned filed on June 27, 1977 for Method of Eliminating Folds and Wrinkles in Glass Filter Cloth.

This invention relates to high temperature industrial dust collection and particularly to an improved filter assembly for high temperature glass fabric filter media cleanable by reverse flow type cleaning techniques.

The utilization of fabric type filters for the separation and collection of industrial dusts at high temperatures has been retarded by the limited availability of felted or woven fabric filter media capable of withstanding operating temperatures of above 400° F. for appreciable periods of time. Most of the conventionally felted and woven filter materials constructed of natural fibers and synthetic fibers such as materials sold under the trademark "Nomex" are totally incapable of withstanding temperatures of above 400° F. Certain other synthetic materials, such as material sold under the trademark "Teflon", are capable of withstanding temperatures up to 490° F. but are very costly to use as filter material. Metallic fiber filters have not been used to any great extent because of the difficulties of making metallic cloth material of desirable porosity characteristics from such fibers. Glass, because of its high melting point, has long been recognized as a desirable filter material for high temperature operations. However, the use of glass fiber filter media has been markedly limited because of its susceptibility to rapid failure when subjected to repeated flexing with attendant wrinkling and creasing that is normally encountered during the repetitive filtering and cleaning cycles.

This problem of limited operating life of glass fiber filter media has been particularly pronounced in fabric filters of the type that employ pulse jet cleaning techniques, wherein cleaning of an elongate tubular-shaped filter is effected by the abrupt and momentary introduction of a high energy pulse of air or gas into the interior of the tubular filter. Such pulse produces a momentary pressure differential countercurrent to that extant during normal filter flow and a dislodgement of accumulated dust particles from the filter material. Such pulse jet type cleaning techniques have come into widespread usage because the cleaning of the filter material effected thereby is highly efficient and requires little maintenance.

The filter elements in such pulse jet filters are conventionally elongate tubular bags or socks of felted or woven fabric surrounding a cylindrical open wire frame. In such units, the filter bag is conventionally sized larger than the wire frame to facilitate both initial installation of the filter bag on the wire frame and subsequent filter bag removal for replacement. This inevitably results in a permitted degree of flexure or play of the filter bag relative to the wire frame. When cleaning is effected by the above noted abrupt and momentary release of high energy pulses of air or gas into the open end of the bag, the filter bag is moved rapidly away from the wire frame. After the momentary cleaning operation, normal filter flow is re-established causing the filter bag to move rapidly back toward and into compressive engagement with the wire frame. Thus the filter bag is subjected to repeated flexing, wrinkling and creasing during the cleaning and filtering operations.

While conventional filter media employed for low temperature dust collection operations are of such character as to accommodate such repeated flexing, wrinkling and creasing for long periods of time, glass fabric filter bags rapidly deteriorate as a result of such flexing, wrinkling and creasing and the consequent limited operational life thereof has limited the use of glass fabric filter bags in dust collectors employing pulse jet cleaning techniques.

Furthermore, retainer supported fabric filter media dust collectors are also characterized by unavoidable diminution of air flow through the filter media where the filter media is interfacially engaged with the retainer surface. This reduced air flow results from the greater accumulations of dust at the areas of maximum air flow through the media. Thus, the opportunity exists for enhanced separation efficiency if both dust collection and cleaning can take place more uniformly over the entire surface area of the filter bag.

This invention may be briefly described as an improved filter bag assembly for high temperature dust collection operations. Such assembly includes, in its broad aspects, a substantially rigid open wire frame or retainer surrounded by a flexible, preferably knitted, wire mesh sleeve providing a highly porous, relatively smooth and continuous external surface for interfacial support of a surrounding, preferably glass, fabric filter bag, having a cross section sufficiently large to permit its ready disposition over and removal from the wire mesh sleeve. An elongate rod-like element is then disposed intermediate the wire mesh sleeve and the open wire frame parallel to a longitudinal axis of the open wire frame to effectively increase the circumference of the wire mesh sleeve. This causes the wire mesh sleeve to provide uniform concentric interfacial support for the surrounding fabric filter bag and to eliminate the play between the fabric filter bag and the wire mesh sleeve supporting the filter bag and also any play between the wire mesh sleeve and the open wire frame so that the filter bag is maintained in a substantially taut, smooth and unwrinkled condition during both normal filter flow and during cleaning operations.

Among the advantages of the subject invention is the provision of an improved fabric filter assembly which has a markedly increased operating life in high temperature environments. Another advantage is the provision of an improved filter mounting assembly that makes possible the effective employment of glass fabric filter media in pulse jet cleanable dust collectors for use in high temperature dust collection operations. A further advantage is the provision of an improved fabric filter assembly which has a marked increase in the efficiency of filtering.

Other objects and advantages of the invention will become apparent from the following portion of this specification and from the appended drawings which illustrate in accord with the mandate of the patent statutes a presently preferred embodiment incorporating the principles of the invention.

Referring to the drawings.

Figure 1:
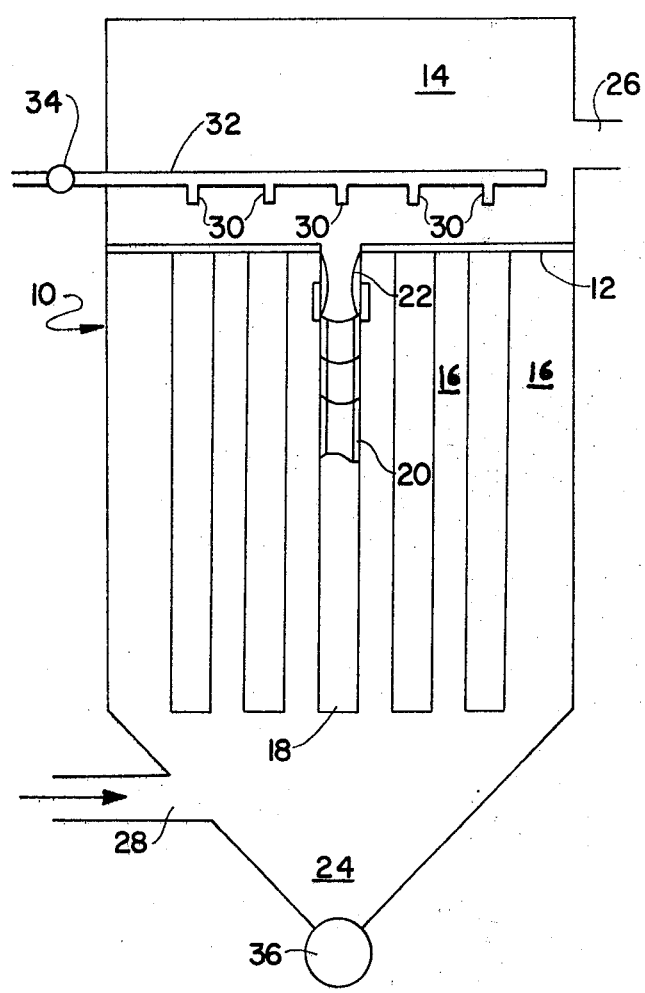
FIG. 1 is a schematic diagram of the essential components of a conventional dust collector cleanable by pulse jet cleaning techniques.

Referring to FIG. 1, there is schematically shown the basic operating components of a conventional dust collector construction employing pulse jet cleaning techniques. Such type filters conventionally include a circular or rectangular housing, normally of modular construction and generally designated 10, having a transverse gas impervious tube sheet 12 mounted therein which operatively subdivides the interior of the housing 10 into clean air and dirty air plenum chambers 14 and 16, respectively.

Dependently supported by the tube sheet 12 within the dirty air plenum 16 are a plurality of elongate cylindrical grid-like filter bag retainers 20 on which are mounted, in surrounding relation, complementary shaped elongate cylindrical bags or socks 18 of permeable filter material. Such permeable filter bags 18 are preferably formed of glass fabric materials for use in high temperature operations but may also be conventionally formed of felted or woven fabric materials or other type filter materials and each necessarily has a diameter larger than the corresponding filter bag or sock retainer to permit its mounting on and removal therefrom.

The interior of each of the filter bag retainers 20 is in fluid communication with the clean air plenum chamber 14 through the upper open ends thereof which normally include individual venturi conduit means 22 disposed within a suitable receiving aperture 23 in the tube sheet 12.

Figure 2:
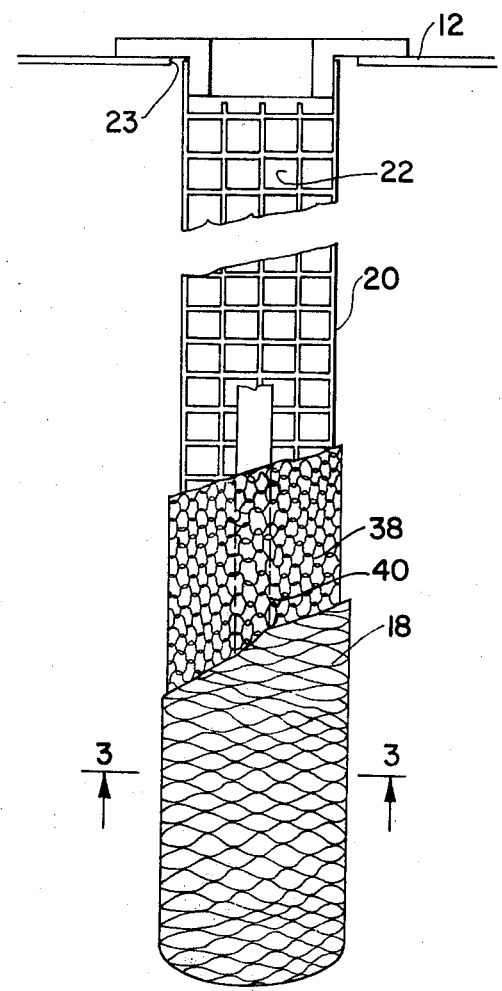
FIG. 2 is a plan view, with portions broken away, of an improved mounting assembly for glass fabric filters incorporating the principles of this invention.

The filter bag retainers 20 as shown in FIG. 2 are preferably constructed in the form of an open grid from metallic or resinous longitudinally and transversely disposed rather heavy wire or light bar stock welded or otherwise secured together at the crossover points. This construction forms a relatively rigid structure that prevents collapse of the filter bag 18 disposed thereabout during normal filter flow operation. Such retainers may alternatively be constituted of cylinders of highly perforated sheet material of planar or corrugated surface configuration.

In normal filter flow operation, the carrier gas stream bearing the particulate material to be separated is directed by a fan or other prime mover (not shown) usually located downstream from a clean air exhaust conduit 26, through an entry conduit 28 into the hopper portion 24 of the housing 10; thence upwardly through the dirty air plenum 16 and through the permeable filter bags 18 into the interior chamber of filter bag retainer 20; thence upwardly through the venturi conduit means 22 into the clean air plenum 14 and thence externally of the housing 10 through the clean air exhaust conduit 26.

The particulate matter carried by the dirty air or carrier gas stream is accumulated, during normal filter flow, on the outer surfaces of the permeable filter bags 18 where such accumulation operates to progressively reduce the permeability of the filter material. Removal of such separated particulate matter from the external surfaces of the filter bags 18 is, in the illustrated embodiment, effected by the abrupt and momentary emission of jets of high energy cleaning gas from jet nozzles 30 disposed in spaced coaxial alignment with the venturi conduit means 22.

During the cleaning cycle of such pulse jet type dust filters, a quick acting valve 34 is periodically actuated to permit the transfer of compressed cleaning gas from a remote source (not shown) into the interior of an elongate blow pipe 32 to which are connected the jet nozzles 30. The compressed cleaning gas exits in jet form from the nozzles 30 as pulses of high energy gas of very short duration, i.e., normally of 1/10 second or less. In a properly designed pulse jet dust filter, such emitted pulses operate to momentarily halt the normal filter flow of carrier gas upwardly through the venturi conduit means 22 and create an abrupt and momentary pressure rise within the filter bags 18 with a concomitant shockwave-like action which dislodges the particulate matter from the external surfaces of the filter bags 18. This particulate matter falls into the hopper 24 from which it is periodically removed through a rotary airlock type valve assembly 36.

Figure 4:
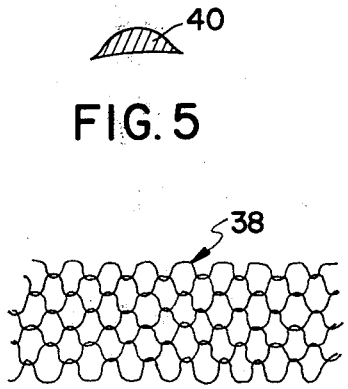
FIG. 4 is an enlarged fragmentary view of a knitted wire mesh sleeve material.

Surrounding the open framework filter bag retainer 20 is a flexible, preferably knitted, wire mesh sleeve 38 as shown in FIG. 2. A detailed view of this knitted wire mesh sleeve 38 is shown in FIG. 4. The filter bag 18 is disposed and fitted over the wire mesh sleeve 38 and has a circumference slightly larger than that of wire mesh sleeve 38 for easy mounting thereof. The wire mesh sleeve 38, which is highly porous, provides a cushion for the filter bag 18 and presents to the interior surface of the filter bag 18 a substantially smooth and continuous surface for interfacial support thereof. It has been experimentally determined that during normal filtering operations the wire mesh sleeve 38 supports the filter bag 18 in such a manner that more efficient operation of the filter results, because the entire surface area of the filter bag 18 is available for cleaning not just the surface area between the elements forming the open framework filter bag retainer 20 and there are no apexes formed in the filter material supported across an open area in the open framework filter bag retainer 20.

A rod-like member 40 is inserted between the wire mesh sleeve 38 and the elongate open framework filter bag retainer 20 in parallel relation to a longitudinal axis of the elongate open framework filter bag retainer 20 to reduce the play between the filter bag 18 supported by wire mesh sleeve 38 and the open framework filter bag retainer 20 by effectively increasing the circumference around which the filter bag 18 and the wire mesh sleeve 38 is fitted. The rod member 40 so disposed intermediate the wire mesh sleeve 38 and the filter bag retainer 20 effectively increases the circumference of the wire mesh sleeve 38 to place the outer surface thereof into substantially continuous interfacial contact with the inner surface of the fabric filter bag 18 disposed in surrounding relation therewith and also reduces the degree of play between the filter media supporting wire mesh sleeve 38 and the filter bag retainer 20 to maintain the filter bag 18 in substantially taut, smooth and unwrinkled condition during both normal filter flow and during cleaning operations.

Figure 3:
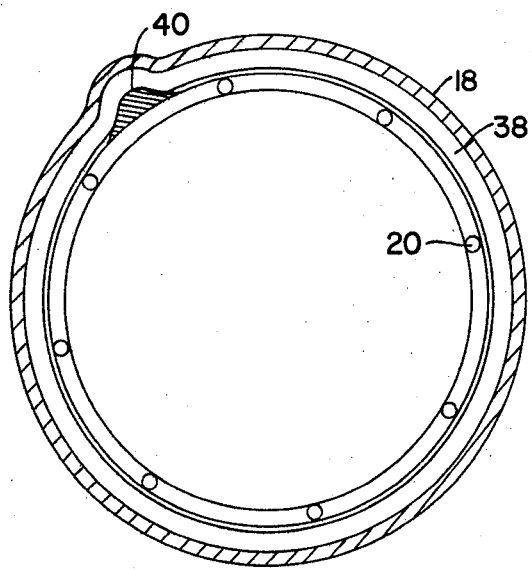
FIG. 3 is a vertical section, taken on line 3—3, of FIG. 2.
Figure 5:
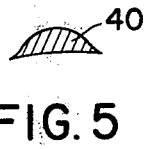
FIG. 5 is an enlarged schematic view, in section, of a presently preferred contour for a slack reducing rod member.

Preferably this rod-like member 40 has a curved surface as shown in FIG. 5 facing the wire mesh sleeve 38 as shown in FIG. 3. During both normal filter flow and cleaning operations the rod-like member 40 and the wire mesh sleeve 38 support the filter bag 18 to minimize effectively localized flexing, creasing and wrinkling. Thus with this arrangement, glass filter bags can be effectively used with markedly extending operating life due to the minimization, if not avoidance, of detrimental flexing, creasing, wrinkling, and the like, that has been characteristic of conventional mountings thereof in pulse jet type collectors.

It is also contemplated that this rod-like member 40 may be formed of other elongate means, for example, an elongate cam which is rotated on its longitudinal axis to a position whereby the filter bag 18 is maintained in a substantially taut, smooth and wrinkle-free condition and may be further rotated to another position to release the filter bag 18 so that it may be removed from the wire mesh sleeve 38.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

I claim:

1. An improved filter assembly for separating particulate matter from a carrier gas stream when such carrier gas stream is directed through permeable fabric filter material in its passage from a dirty air plenum to a clean air plenum otherwise separated by a gas impervious tube sheet having at least one aperture therein providing fluid communication between the dirty and clean air plenums comprising:

an elongate rigid cylindrical open framework retainer means depending from the tube sheet into the dirty air plenum and having one end mounted in said aperture in the tube sheet and a longitudinal axis;

a flexible mesh sleeve means disposed in surrounding relation with the retainer means which together with the retainer means compositely form a highly porous structure for supporting the permeable fabric filter material;

the permeable fabric filter material formed to provide an elongate tubular bag sized to be slidably disposed in surrounding relation on the flexible mesh sleeve; and removably insertable elongate means which when disposed substantially parallel to the longitudinal axis of the retainer means and intermediate the retainer means and the elongate tubular bag of permeable fabric filter material increases the circumference around which the tubular bag of permeable fabric filter material is fitted whereby the tubular bag of permeable fabric filter material is maintained in a substantially taut, smooth and unwrinkled condition.

2. An improved filter assembly accoring to claim 1 wherein the removably insertable elongate means comprises a rod member having a smoothly curved surface disposed in facing relation with the tubular bag of permeable fabric material to avoid formation of wrinkles in the permeable fabric filter material adjacent the rod member.

3. An improved filter assembly according to claim 1 wherein said removably insertable elongate means is disposed intermediate the retainer means and the flexible mesh sleeve means.

4. The improved filter assembly according to claim 3 wherein the removably insertable elongate means comprises a rod member having a smoothly curved surface disposed in facing relationship with the tubular bag of permeable fabric filter material to avoid formation of wrinkles in the permeable fabric filter material adjacent the rod member.

5. The improved filter assembly according to claim 1 wherein the permeable fabric filter material is constructed of glass fiber.

6. An improved high temperature filter bag assembly for a pulse jet type dust collector wherein particulate matter is separated from a carrier gas stream by selective passage of the carrier gas through a permeable filter medium terminally mounted in fluid communication with a receiving aperture in a gas impervious tube sheet separating clean air and dirty air plenum chambers of said dust collector, said assembly comprising:

an elongate rigid cylindrical open framework retainer means having a longitudinal axis and being of a predetermined external diameter, said retainer means depending from the tube sheet into the dirty air plenum and having one end mounted in said aperture in the tube sheet;

flexible wire mesh sleeve means sized to slidably receive and be disposed in surrounding relation with said retainer means to compositely form a highly porous filter medium support structure;

the permeable filter medium comprising a glass fiber filter medium and formed to provide an elongate tube sized to slidably receive and surround said flexible wire mesh sleeve means; and removably insertable elongate means disposed substantially parallel to the longitudinal axis of said retainer means and positioned intermediate said retainer means and said flexible wire mesh sleeve means for increasing the circumference of said flexible wire mesh sleeve means to place the outer surface thereof into substantially continuous interfacial contact with the inner surface of said glass fiber filter medium disposed in surrounding relation therewith whereby the glass fiber filter medium is maintained in a substantially taut, smooth and unwrinkled condition to reduce flexing and creasing of the glass fiber filter medium during both normal filter flow and during cleaning operations.

7. An improved filter bag assembly as set forth in claim 6 wherein said flexible wire mesh sleeve means comprises a knitted tube.

8. An improved filter bag assembly for a pulse jet type dust collector wherein particulate matter is separated from a carrier gas stream by selective passage of the carrier stream through an elongate tube of permeable filter medium terminally mounted in fluid communication with a receiving aperture in a gas impervious tube sheet separating clean air and dirty air plenum chambers of said dust collector comprising:

an elongate rigid cylindrical open framework retainer means having a longitudinal axis and being of a predetermined external diameter, said retainer means depending from the tube sheet into the dirty air plenum and having one end mounted in said aperture in the tube sheet;

flexible wire mesh sleeve means sized to slidably receive and be disposed in surrounding relation with said retainer means to compositely form a highly porous filter medium support structure;

the permeable filter medium formed to provide an elongate tube sized to slidably receive and surround said flexible wire mesh sleeve means;

a movable elongate means adapted to be disposed substantially parallel to the longitudinal axis of said retainer means and positioned intermediate said retainer means and said flexible wire mesh sleeve means and movable from a position to increase the circumference of said flexible wire mesh sleeve means to a position where said circumference is reduced;

the elongate means is sized so that when it is moved to a position to increase the circumference of said flexible wire mesh sleeve means around which said permeable filter medium is fitted, the outer surface of said sleeve means if placed into substantially continuous interfacial contact with the inner surface of said permeable filter medium disposed in surrounding relation therewith so that the permeable filter medium is maintained in a substantially taut, smooth and unwrinkled condition to reduce flexing and creasing of the permeable filter medium during both normal filter flow and during cleaning operations; and the elongate means is further sized so that when it is moved to the position where said circumference is reduced the elongate tube of permeable filter medium may be easily removed from or inserted on the flexible wire mesh sleeve means.

9. An improved filter bag assembly according to claim 8 wherein said flexible wire mesh sleeve means comprises a knitted tube.

10. An improved filter bag assembly according to claim 8 wherein the elongate tube of permeable filter medium is constructed of glass fiber.

* * * * *